United States Patent
Oesterholt et al.

[11] Patent Number: 6,130,514
[45] Date of Patent: Oct. 10, 2000

[54] ELECTRICALLY OPERABLE PIVOTING ACTUATOR, AND WING MIRROR HAVING AN ELECTRICALLY OPERABLE PIVOTING MECHANISM

[75] Inventors: Göran Bernd Oesterholt, Enschede; Adrianus Johannes Blom, Zeist; Stefan Frits Brouwer, The Hague; Albertus van Zanten, 's-Hertogenbosch, all of Netherlands

[73] Assignee: IKU Holding Montfoort B.V., Montfoort, Netherlands

[21] Appl. No.: 09/180,667

[22] PCT Filed: May 14, 1997

[86] PCT No.: PCT/NL97/00268

§ 371 Date: Nov. 12, 1998

§ 102(e) Date: Nov. 12, 1998

[87] PCT Pub. No.: WO97/43144

PCT Pub. Date: Nov. 20, 1997

[30] Foreign Application Priority Data

May 15, 1996 [NL] Netherlands ............................. 1003144

[51] Int. Cl.[7] ................................ G05F 1/70; H02P 5/28; H02P 7/36
[52] U.S. Cl. .......................... 318/438; 248/479; 248/549; 248/900; 359/872; 359/876; 359/877
[58] Field of Search ............................. 318/438; 248/479, 248/549, 900; 359/872, 876, 877

[56] References Cited

U.S. PATENT DOCUMENTS

| | | | |
|---|---|---|---|
| 5,172,884 | 12/1992 | Ishiyama | 248/479 |
| 5,384,660 | 1/1995 | Oishi | 359/841 |
| 5,432,641 | 7/1995 | Mochizuki | 359/841 |
| 5,594,590 | 1/1997 | Ishiyama | 359/841 |
| 5,636,071 | 6/1997 | Mochizuki et al. | 359/877 |
| 5,734,517 | 3/1998 | Kang | 359/877 |
| 5,781,354 | 7/1998 | Sakata | 359/841 |
| 5,823,054 | 10/1998 | Brouwer | 74/425 |
| 5,867,328 | 2/1999 | Stapp et al. | 359/841 |
| 6,022,113 | 2/2000 | Stolpe et al. | 359/841 |

Primary Examiner—David Martin
Assistant Examiner—Edgardo San Martin
Attorney, Agent, or Firm—Roger A. Johnston

[57] ABSTRACT

An electrically operable pivoting mechanism (10) for causing a mirror housing (3) of a wing mirror to pivot. The mirror housing can be brought from any position into any other position manually, and can be brought from any position into the normal operational position electrically by means of the mechanism (10). The mechanism (10) has a construction which is simple an an therefor be easily manufactured. The mechanism comprises a plurality of arcuate grooves and corresponding configured projections engaging the grooves for defining the extreme positions of the mirror housing.

10 Claims, 9 Drawing Sheets

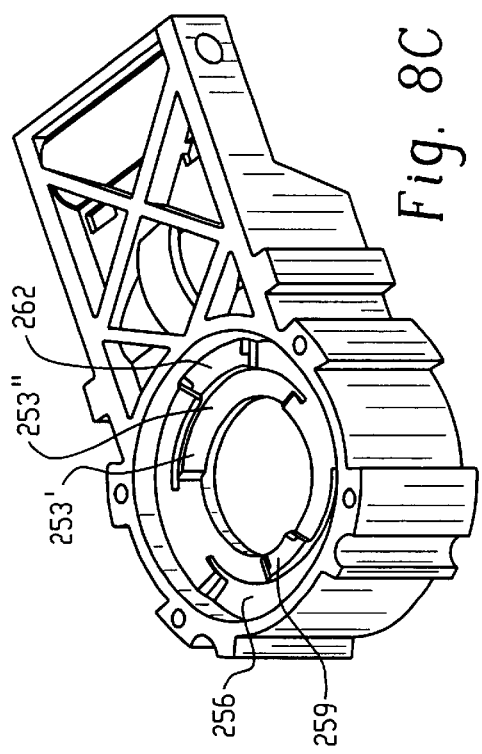
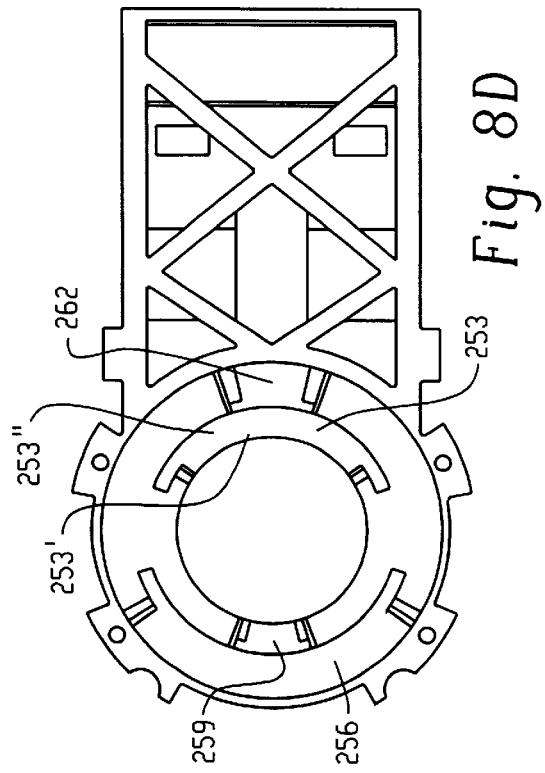
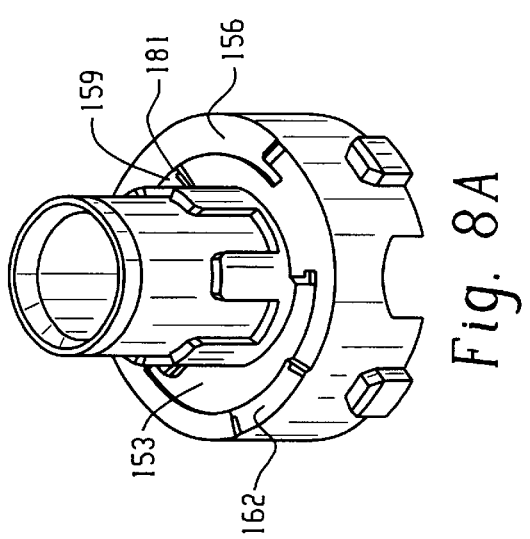
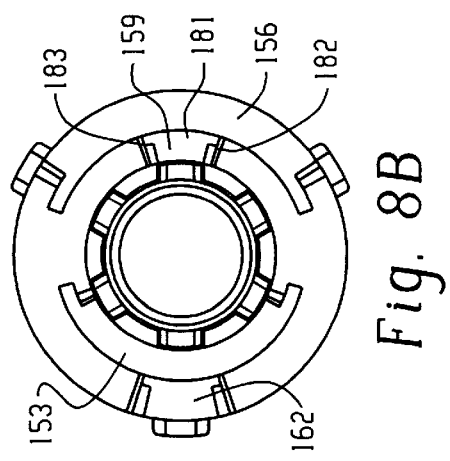

ELECTRICALLY OPERABLE PIVOTING ACTUATOR, AND WING MIRROR HAVING AN ELECTRICALLY OPERABLE PIVOTING MECHANISM

CROSS REFERENCE TO RELATED APPLICATION

Not Applicable;

STATEMENT REGARDING FEDERALLY SPONSORED RESEARCH OR DEVELOPMENT

Not Applicable;

REFERENCE TO MICROFICHE APPENDIX

Not Applicable

BACKGROUND OF THE INVENTION

The invention relates to a wing mirror having an electrically operable pivoting mechanism, and to an electrically operable pivoting actuator.

A pivoting actuator comprises two actuator parts rotatably mounted relative to each other. Furthermore, an electrically operable pivoting actuator comprises an electromotor and a transmission system for rotating those actuator parts relative to each other. A pivoting actuator can be used for various applications where it is desired to rotate or pivot two structural members relative to each other. For that purpose, one actuator part will be attached to one of these structural members, and the other actuator part will be attached to the other one of these structural members; when the actuator parts are then rotated relative to each other, operated electrically or non-electrically, the structural members will rotate or pivot relative to each other about a rotation or pivot axis coinciding with the rotation axis of the actuator parts. Within the scope of the present invention, the terms "rotate" and "pivot" will be used interchangeably.

Such a pivoting actuator can be used particularly but not exclusively in a wing mirror of a vehicle such as for instance a motorcar. Hence, the invention will hereinafter be described for such a practical example.

It is generally known that cars are fitted with at least one wing mirror. The wing mirror comprises a bowl-shaped mirror housing having disposed therein a mirror plate, which, during use, is directed substantially at right angles to the longitudinal direction of the car to enable the driver to view the road section located alongside and behind the car. The mirror housing projects over a particular distance from the side of the car. In particular situations, it is desired that that distance will be reduced, for instance during parking in a narrow space. For that purpose, the mirror housing can be pivoted relative to the car about a pivot axis which, in most cases, is directed substantially vertically, and the end of the mirror housing can be moved closer to the body of the car through a rearwardly directed rotational movement about that axis; such a movement will hereinafter be referred to as folding in, and the position thus reached will be referred to as fold-in position. The reverse pivotal movement, from the fold-in position to the normal operational position (also referred to as fold-out position) will be referred to as folding out.

This pivoting possibility also concerns a safety aspect. If an obstacle outside the car touches the mirror housing, the mirror housing yields, so that damage is avoided or at least reduced, both to the car and the mirror and to the obstacle, which may also be a person. Hence, for reasons of safety, it is desired, and often even laid down by law, that the mirror housing is capable of making a comparable pivotal movement in forward direction. Hereinafter, such a movement will be referred to as folding over, and the position thus reached will be referred to as fold-over position. The reverse pivotal movement, from the fold-over position to the normal operational position, will be referred to as folding back.

To enable those pivotal movements, the mirror housing is pivotably mounted on a mirror foot or mirror base, intended to be fixedly mounted on the car. These pivotal movements can then be carried out under the influence of an external force, which will be referred to as manual operation. From a viewpoint of control convenience, the wing mirror further comprises a pivoting actuator or pivoting mechanism which can be electrically controlled by the driver of the car, i.e. for instance by pressing a button, for carrying out this fold-in movement and this fold-out movement. The pivoting mechanism comprises an electromotor and a transmission mechanism coupled to the mirror housing and the mirror foot. The pivoting mechanism is designed so that it is not only able to carry out the fold-in movement and the fold-out movement through excitation of the electromotor, but also to permit all these pivotal movements during the action of an external force without damaging the motor and/or transmission mechanism.

Pivoting actuators having the properties described hereinabove are now generally known. An example thereof is for instance described in German patent specification 4,023,375. In this known construction, two grooves are concentrically provided in a housing part of the driving gear, of which the first groove has a smaller length than the second groove. Provided diametrically opposite the first groove is a third groove having the same length as the first groove. The mirror foot has a stop cam engaging the second groove of greater length. When a pivotal movement of the mirror housing relative to the mirror foot is carried out, this stop cam moves through the second groove; the ends of the second groove form a stop for this stop cam, and thus define the extreme fold-in position and the extreme fold-over position of the wing mirror. The mirror foot further comprises a cam disc which under normal conditions couples the mirror foot to the central axis by means of noses engaging recesses fixed relative to the mirror foot. This cam disc comprises two stop cams which engage the first and third grooves respectively of the housing part of the driving gear. Under normal conditions, these two stop cams will move through the first and third grooves of the housing part during a pivotal movement between the fold-in position and the fold-out position. One end of the first groove forms a stop for the stop cam running therein, just as one end of the third groove forms a stop for the stop cam running therein, which stops define the fold-out position of the wing mirror.

The construction described in this publication is hence rather complicated, and comprises relatively many components.

For carrying out a fold-over movement from the fold-out position, it is necessary that the coupling between the cam disc and the mirror foot be removed. For that purpose, the noses of the cam disc leave the recesses. The folding back of a mirror housing from the fold-over position to the normal operational position should then be carried out manually, which is regarded as a drawback. If in the fold-over position the electromotor is excited, the mechanism can under certain conditions find a "normal" position which does not correspond to the fold-out position intended.

Further, it is a drawback of the known construction that the component having grooves is not symmetrical, so that the known pivoting mechanism can only be used for a left mirror or for a right mirror. In other words, for a left mirror and for a right mirror, two mutually different pivoting mechanisms should be provided, which is relatively expensive.

SUMMARY OF THE INVENTION

The object of the present invention is to improve such a pivoting actuator.

More in particular, the object of the present invention is to provide a pivoting actuator of a further improved control convenience, having a substantially simplified construction so that the manufacturing costs are relatively low.

An important object of the present invention is to provide a pivoting actuator of which the number of components has been reduced compared with the known pivoting actuators.

Another important object of the present invention is to provide a pivoting actuator which can be used without modifications both in a left mirror and in a right mirror. Thus, a reduction of the production costs is achieved, because the manufacturer does not have to distinguish between two types of pivoting actuators.

Yet another important object of the present invention is to provide a pivoting actuator which is able to carry out a fold-back movement from the fold-over movement by means of the electromotor.

Further, the object of the present invention is to provide a wing mirror which comprises such a pivoting actuator having the above-mentioned properties.

BRIEF DESCRIPTION OF THE DRAWINGS

An embodiment of the actuator according to the present invention which realizes all the above objectives will be further explained in the following description with reference to the accompanying drawings, wherein:

FIGS. 8A and 8B are views, comparable with FIGS. 5A and 5B respectively, of another variant of a mirror base;

FIGS. 8C and 8D are views, comparable with FIGS. 6B and 6C respectively, of another variant of a frame.

DETAILED DESCRIPTION

Figure 1:
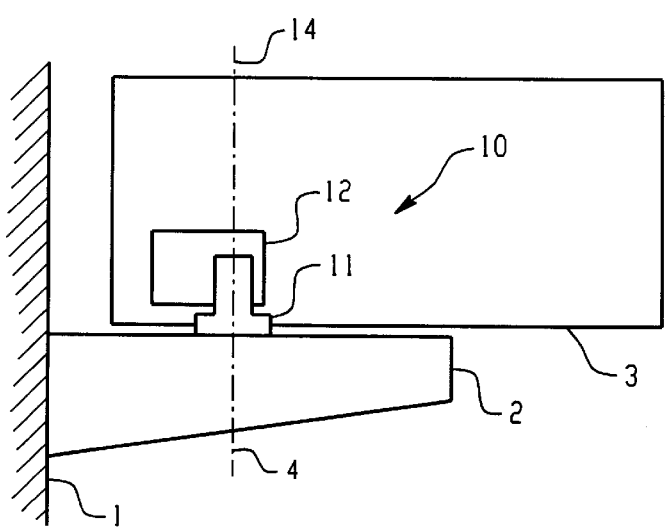
FIG. 1 schematically shows a front view of a vehicle having a wing mirror.

FIG. 1 schematically shows a front view of a sidewall of a vehicle 1, to which a substantially horizontally extending support 2 is attached. Attached to the support 2 is a mirror housing 3, pivotable about a pivot axis 4 that extends substantially vertically. As is clearly shown in FIGS. 2A–C, the mirror housing 3 is substantially bowl-shaped, the bottom of that bowl form being directed forwards. Disposed in the mirror housing 3 is a mirror plate 5, substantially according to a verticale plane, which mirror plate 5 is pivotable relative to the mirror housing 3 about a pivoting point 6. More in particular, a mirror adjusting mechanism is disposed in the mirror housing 3, which mechanism is adapted to set the position of the mirror plate 5 through a pivotal movement about two mutually perpendicular axes, viz. a vertical axis and a horizontal axis. As the nature and construction of that mirror adjusting mechanism do not constitute a subject of the present invention, and a skilled person need not have knowledge thereof for a proper understanding of the present invention, they will not be further described. It suffices to observe that a mirror adjusting mechanism known per se can be utilized.

In FIG. 1, it is further schematically indicated that in the mirror housing 3 a pivoting mechanism 10 is arranged, of which a first pivot part 11, which will be referred to as mirror base, is mounted on the support 2, while a second pivot part 12 is mounted on the mirror housing 3. The pivot parts 11 and 12 are rotatable relative to each other about a rotation axis 14 which, when the mirror housing 3 and the pivoting mechanism 10 are mounted on the support 2, is aligned with the pivot axis 4.

Figure 2B:
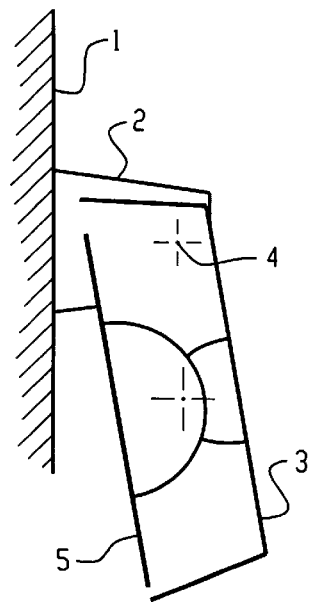
FIGS. 2A–C schematically show a top plan view of a vehicle having a wing mirror in an operational position (FIG. 2A), a fold-in position (FIG. 2B), and a fold-over position (FIG. 2C)
Figure 2A:
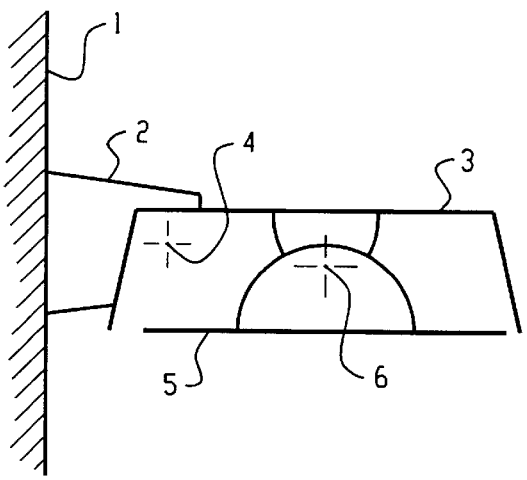
Figure 2C:
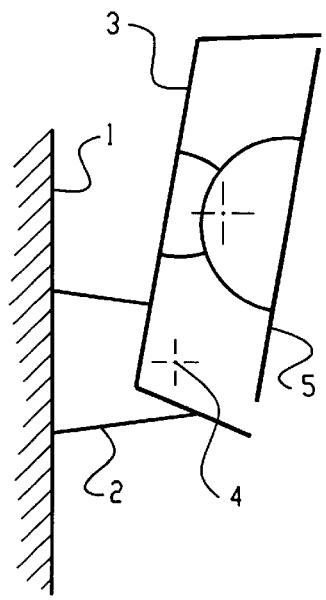

FIGS. 2A–C schematically show, in the case of a right mirror, a top plan view of the vehicle 1 having the mirror housing 3. During normal use, the mirror housing 3 is in an operational position (FIG. 2A), with the mirror plate 5 extending substantially perpendicularly to the sidewall of the vehicle 1. This normal operational position is also referred to as fold-out position.

FIG. 2B schematically illustrates a position wherein the mirror plate 5 faces the vehicle 1. From the normal operational position, the mirror housing 3 can be brought into such a position through a rearward pivotal movement about the pivot axis 4 (folding in), and from that position, the mirror housing 3 can be brought back into the normal operational position through a forward pivotal movement about the pivot axis 4 (folding out). It will be understood that it is desired that means be present to prevent the possibility that the mirror housing 3 is folded in thus far that the mirror housing 3 can touch the vehicle 1. Such means for limiting the folding-in freedom, which will be discussed in more detail hereinafter, thus define an extreme fold-in position; positions of the mirror housing 3 between the operational position and the extreme fold-in position will be referred to as fold-in intermediate position.

FIG. 2C schematically illustrates a position wherein the mirror plate 5 faces away from the vehicle 1. The mirror housing 3 can be brought from the normal operational position into such a position through a forward pivotal movement about the pivot axis 4 (folding over), and from that position, the mirror housing 3 can be brought back to the normal operational position through a rearward pivotal movement about the pivot axis 4 (folding back). It will be understood that it is desired that means be present to prevent the possibility that the mirror housing 3 is folded over thus far, that the mirror housing 3 can touch the vehicle 1. Such means for limiting the folding-over freedom, which will be discussed in more detail hereinafter, thus define an extreme fold-over position; positions of the mirror housing 3 between the operational position and the extreme fold-over position will be referred to as fold-over intermediate position.

The fold-in movement can be carried out consciously by the user; the fold-over movement will generally be carried out unconsciously by the user. Both the fold-in movement and the fold-over movement can also be caused accidentally, for instance by a pedestrian walking past, or because, during driving, the mirror housing is caught by an obstacle. Consequently, the pivoting mechanism 10 is adapted to permit the fold-in movement and the fold-over movement, as well as the fold-out movement and the fold-back movement, under the influence of an external force (such as for instance manual operation). Further, as will be described in more detail hereinafter, the pivoting mechanism 10 comprises means for finding back the normal operational position (FIG. 2A) so as to be reproducible with certainty, no matter whether the folding-out or folding-back operation is carried out manually or electrically.

The pivoting mechanism 10 further comprises an electromotor and a transmission system, which are not shown in FIGS. 1–2 for the sake of simplicity. The transmission system is coupled to the pivot parts 11 and 12, so that when the electromotor is excited, the pivot parts 11 and 12 are rotated relative to each other so as to cause the mirror housing 3 to pivot relative to the vehicle 1 in a direction determined by the direction of rotation of a driven shaft of the electromotor. In this manner, the fold-in movement, the fold-out movement and the fold-back movement can be carried out at a distance through operation of the electromotor; there is no need for carrying out the fold-over movement electrically.

Figure 3:
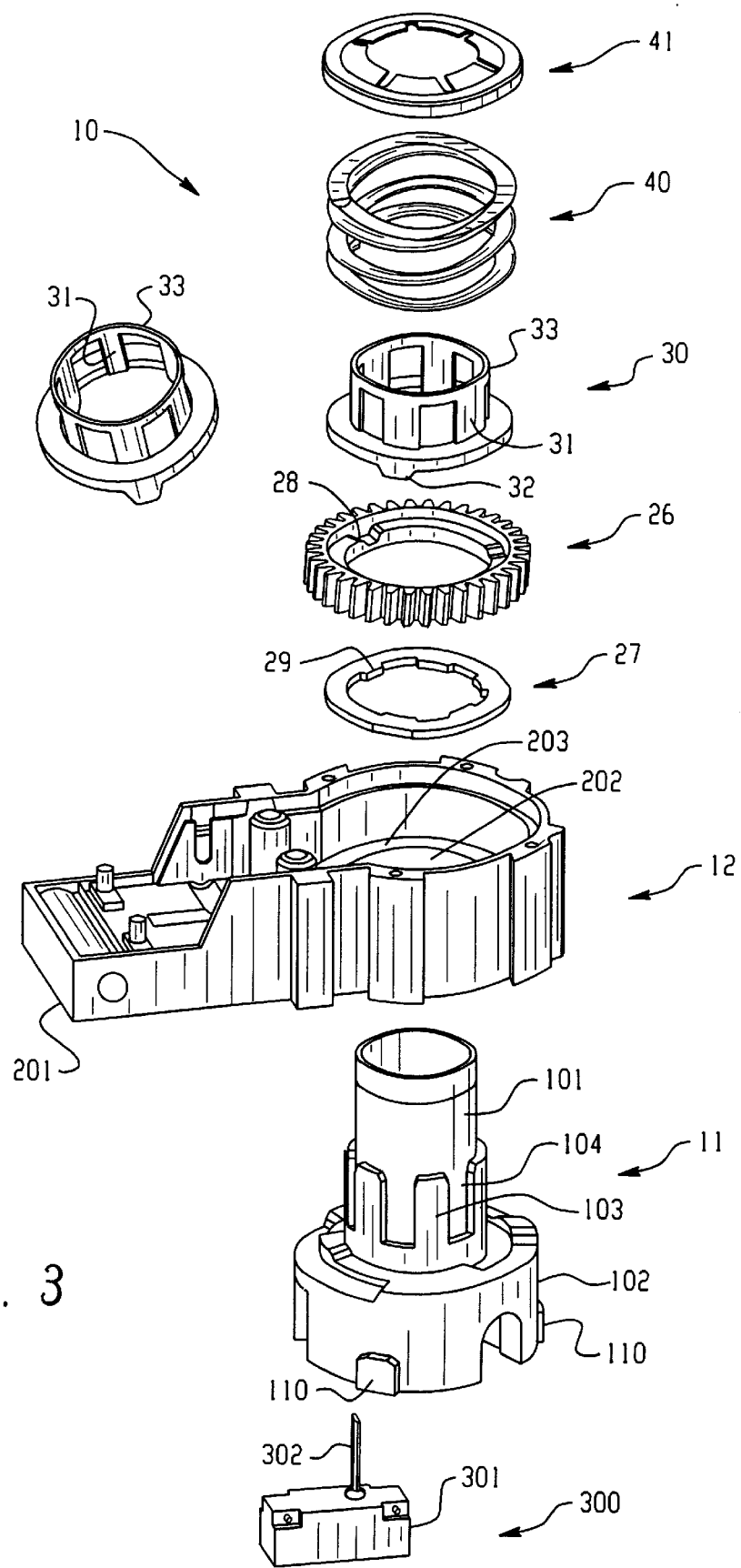
FIG. 3 shows a perspective view of the main components of a preferred embodiment of the pivoting mechanism in disassembled condition.
Figure 4:
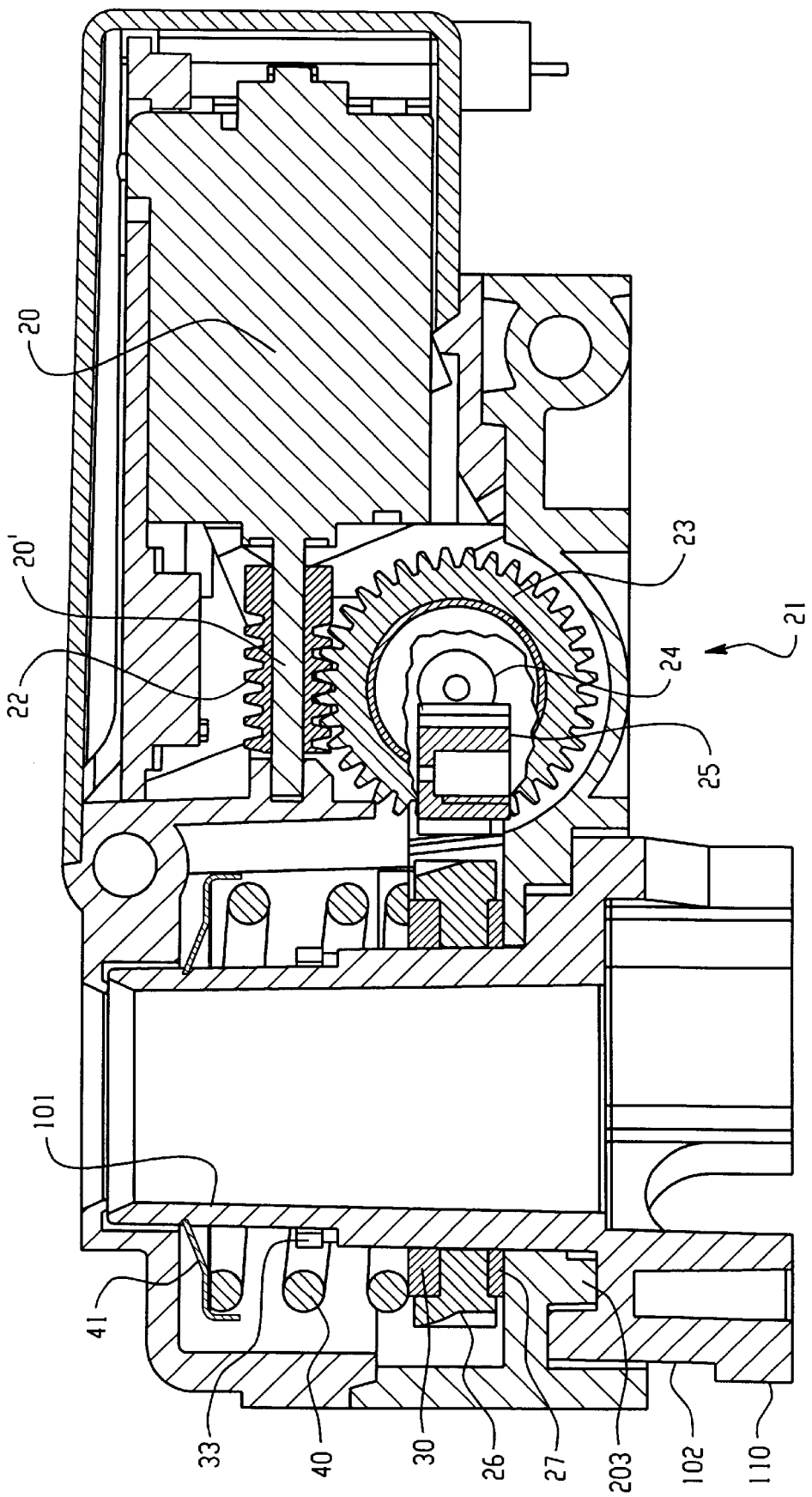
FIG. 4 shows the pivoting mechanism .n mounted condition, partly in section and partly in view.

Now, the construction of a preferred embodiment of the pivoting mechanism 10 according to the present invention will be described in more detail with reference to FIGS. 3–6. FIG. 3 shows a perspective view of the main components of the pivoting mechanism 10 in disassembled condition. FIG. 4 shows a schematic cross section of the pivoting mechanism 10 in mounted condition.

Figure 5A:
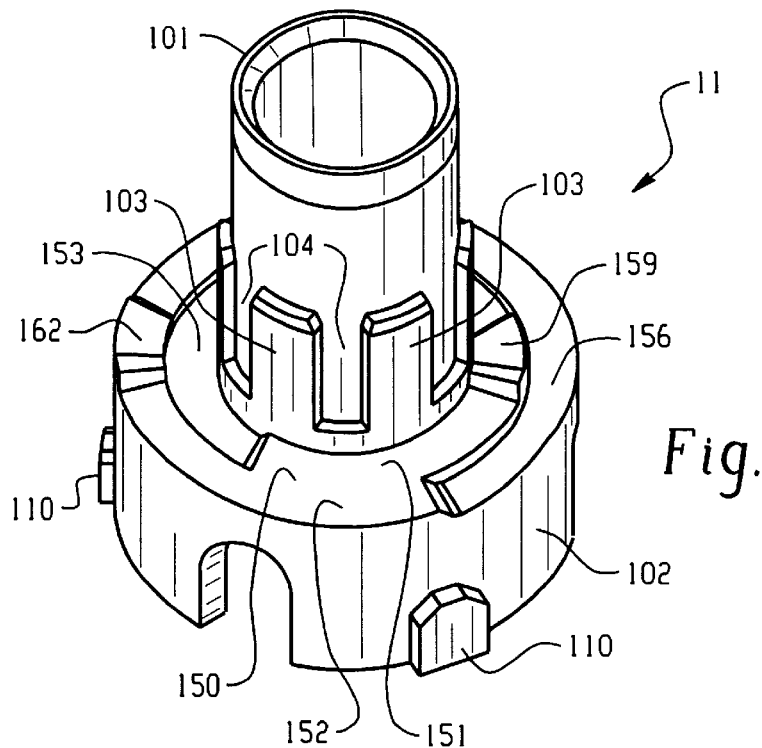
FIG. 5A is a perspective view of a mirror base.
Figure 5B:
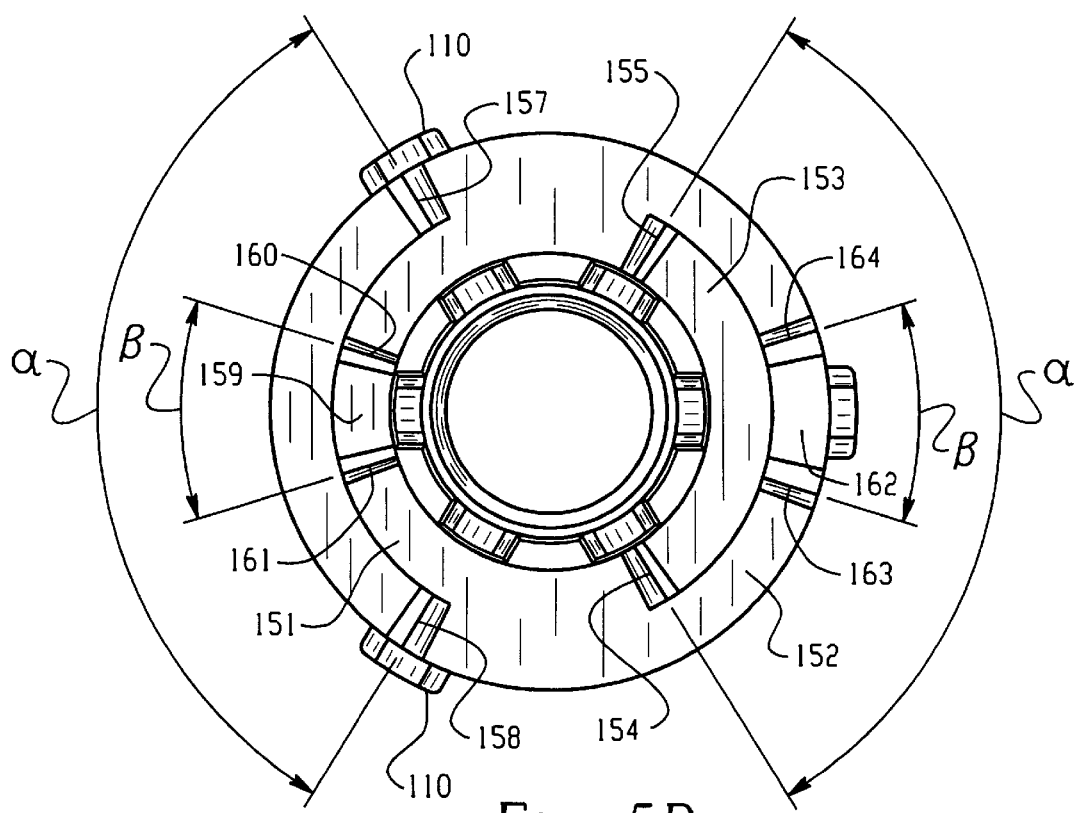
FIG. 5B is a top plan view of the mirror base shown in FIG. 5A.

As appears from FIGS. 3 and 4, the first pivot part 11, which will be referred to as mirror base, generally has a hollow cylindrical shape, generally comprising a relatively narrow top portion 101, which will be referred to as base shaft 101, and a relatively wide bottom portion 102, which will be referred to as base flange. FIG. 5A is a more detailed perspective view of the mirror base 11, and FIG. 5B is a top plan view thereof. The base flange 102 is adapted to be mounted on the support 2. This mounting can take place by means known per se, such as for instance screws. However, as shown, the base flange 102 preferably comprises radial projections 110, in the example shown three, fitting in corresponding recesses in the support 2 to form a bayonet fit, as a result of which the mounting of the base flange 102 on the support 2 is relatively simple.

Figure 6A:
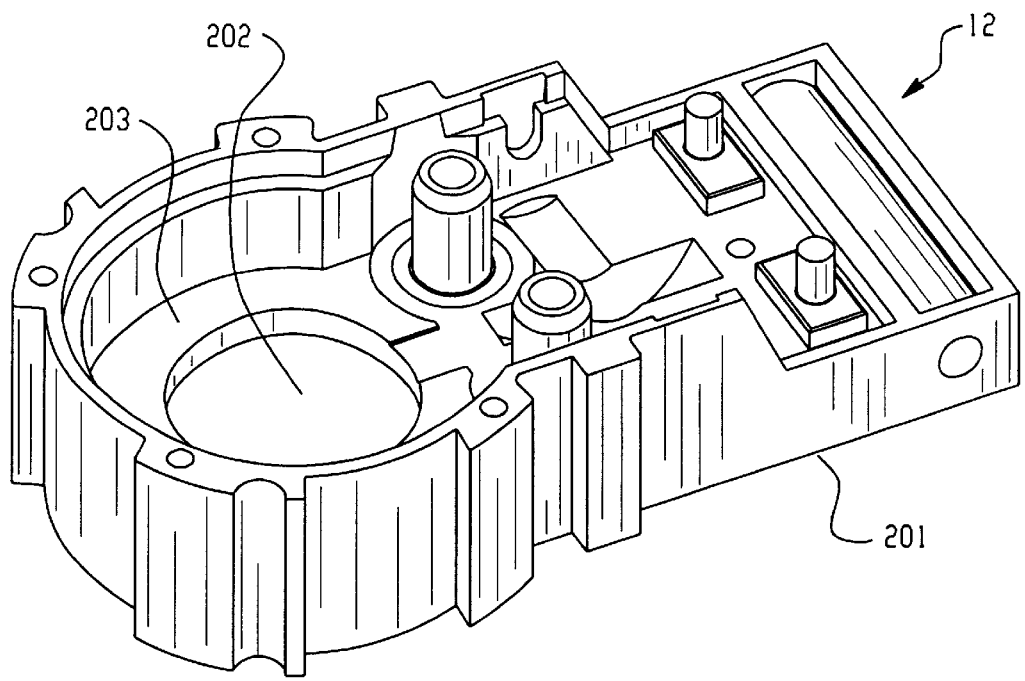
FIG. 6A is a perspective view of a frame viewed from the top.
Figure 6B:
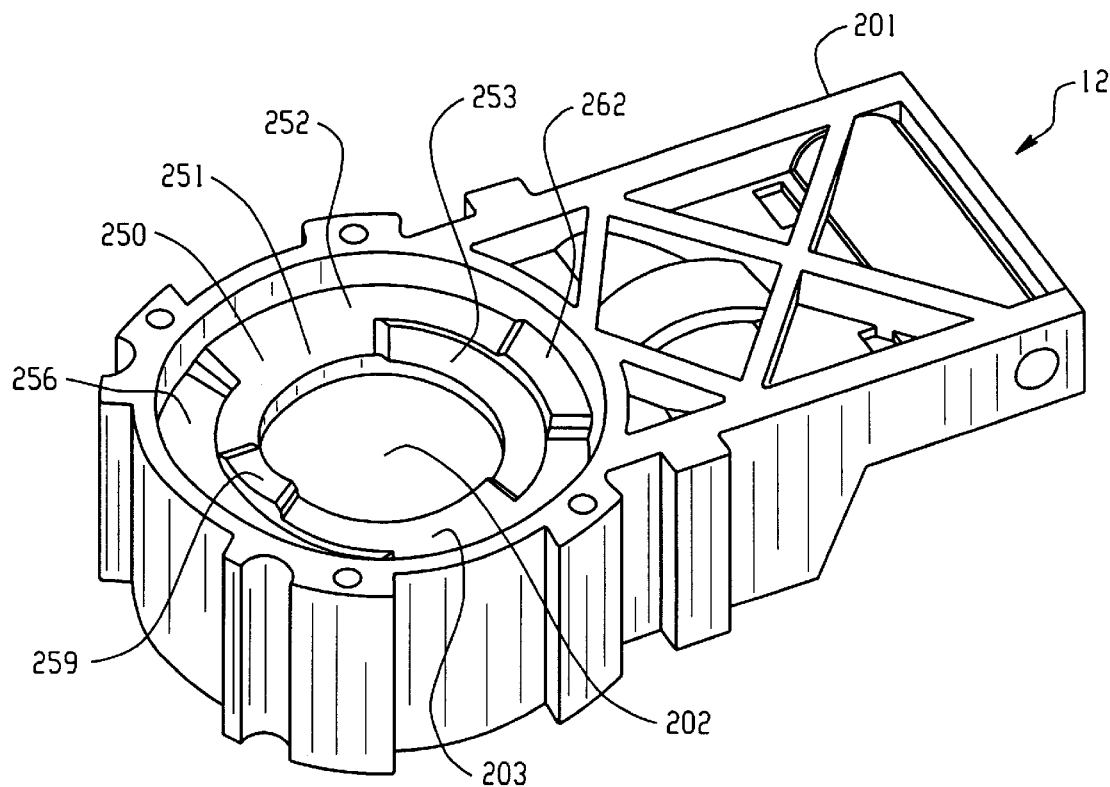
FIG. 6B is a perspective view of the frame shown in FIG. 6A, viewed from the bottom.
Figure 6C:
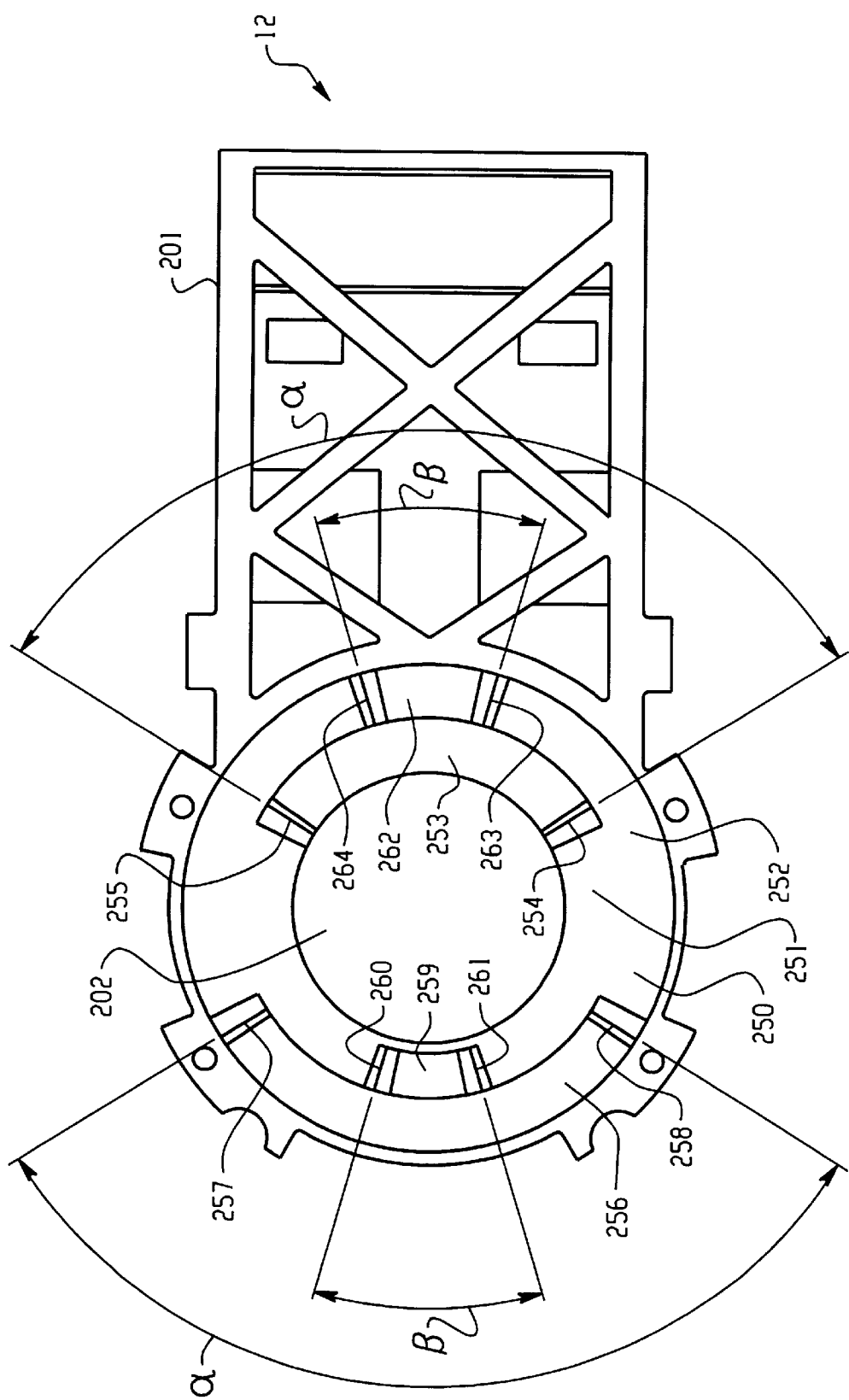
FIG. 6C is a bottom view of the frame shown in FIG. 6A.
Figure 7C:
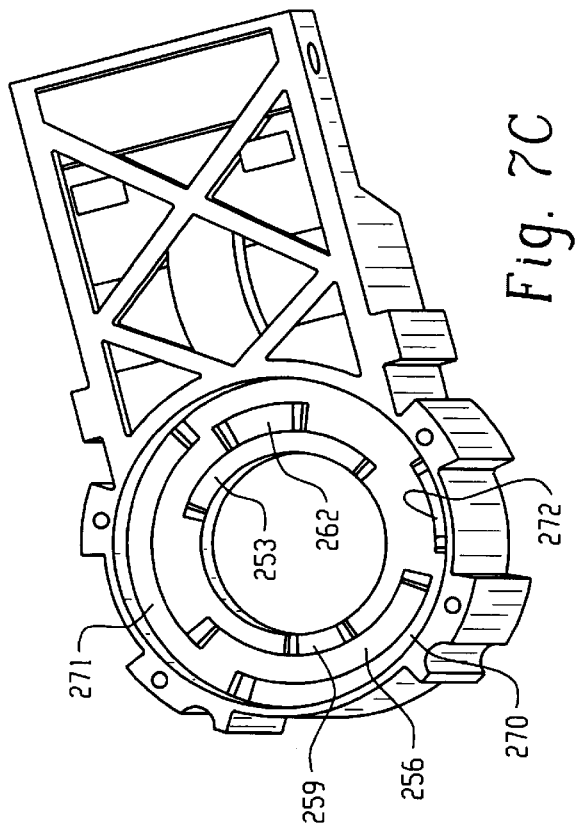
FIGS. 7C and 7D are views, comparable with FIGS. 6B and 6C respectively, of a variant of a frame.
Figure 7D:
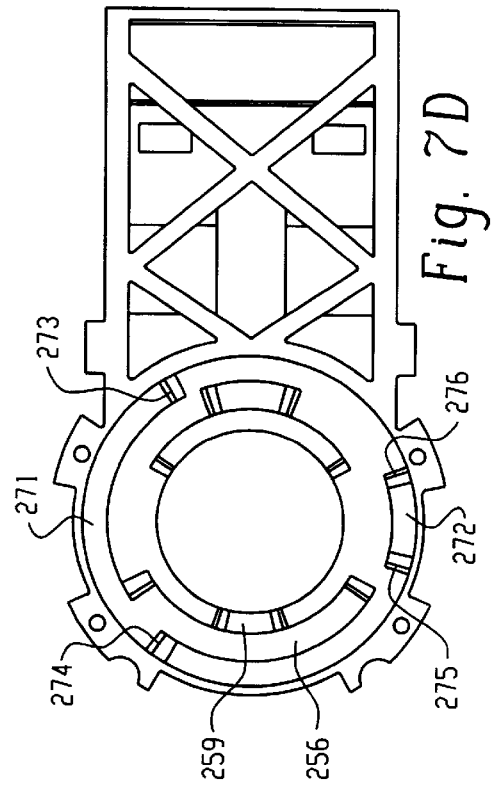
Figure 7A:
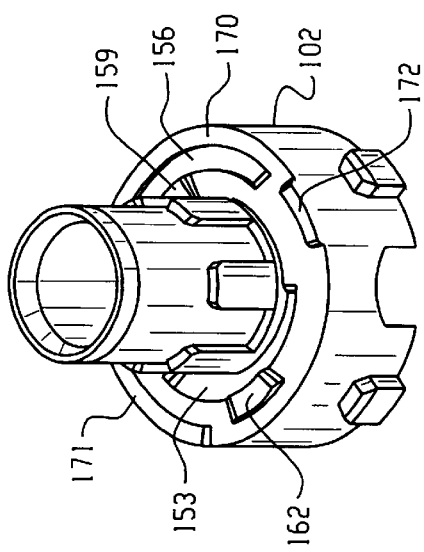
FIGS. 7A and 7B are views, comparable with FIGS. 5A and 5B respectively, of a variant of a mirror base.
Figure 7B:
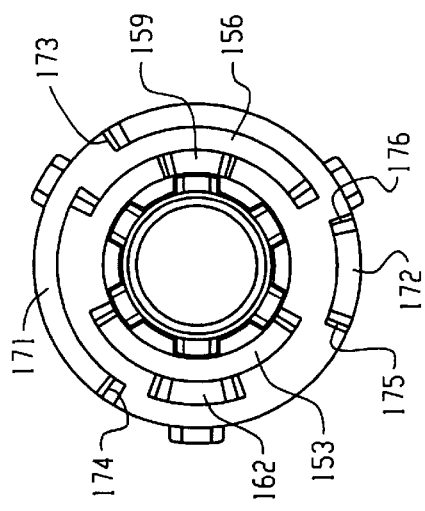

As further appears from FIG. 3, the second pivot part 12, which will be referred to as frame, comprises a substantially flat bottom plate 201 provided with a circular opening 202 through which the base shaft 101 extends. This circular opening 202 is defined by an annular frame part 203, the bottom side of which rests on the top side of the base flange 102. The frame 12 is adapted to be attached to the mirror housing 3 by any suitable means, for instance screws, not shown separately for the sake of simplicity. FIG. 6A is a more detailed perspective view of the frame 12, viewed from the top; FIG. 6B is a more detailed perspective view of the frame 12, viewed from the bottom; and FIG. 6C is a bottom view of the frame 12.

For the sake of the electric operation of a folding movement (pivotal movement), the pivoting mechanism 10 according to the present invention further comprises an electromotor 20 mounted on the frame 12 (FIG. 4), of which electromotor a driven shaft 20' is coupled, via a transmission system 21, to the base shaft 101. In the embodiment shown, the transmission system 21 comprises a worm 22, driving a worm wheel 23, to which a second worm 24 is coaxially attached, driving a second worm wheel 25. The components of the transmission system 21 are bearing-mounted in the frame 12; the bearing means of the frame 12 which are used for that purpose are recognizable in FIG. 6A. In fact, two second worm wheels 25 are present, each driven by the second worm 24. Each second worm wheel 25 is in engagement with an annular coupling gear wheel 26. The annular coupling gear wheel 26 is arranged coaxially to the base shaft 101 and rests on the top side of the annular frame part 203, preferably and as illustrated with the interposition of a friction ring 27 which is secured in rotational sense relative to the base shaft 101. The coupling gear wheel 26 itself is freely rotatable about the base shaft 101, but is coupled to the base shaft 101 via a couple-limited claw coupling. For that purpose, the pivoting mechanism 10 according to the present invention further comprises an annular coupling member 30 which is rotationally secured relative to the base shaft 101, but which can be shifted in axial direction relative to the base shaft 101. To that end, in the embodiment shown, the base shaft 101 is on its cylindrical surface provided with longitudinally extending, radially projecting fingers 103, with key ways 104 defined between adjacent fingers 103, while the annular coupling member 30 is provided with radially inwardly directed projections 31 fitting in the key ways 104. Formed on the bottom surface of the annular coupling member 30 are noses 32, in the example shown three, fitting in recessed portion 28 in the top face of the coupling gear wheel 26.

In the embodiment illustrated, the radially inwardly directed projections 31 of the annular coupling member 30 are axially extended on the top side of that annular coupling member 30, i.e. in the direction pointing away from the coupling gear wheel 26, and the axial top ends of those extended projections 31 are interconnected by a connecting ring 33. Thus, these inwardly directed projections 31 of the annular coupling member 30 contact the key ways 104 of the base shaft 101 through a relatively large axial distance, so that that annular coupling member 30 is positioned relative to the base shaft 101 in a more stable manner. For the sake of clarity, on the left in FIG. 3, a perspective view of the annular coupling member 30 is shown, viewed from a different direction.

On the annular coupling member 30, a helical spring member 40 is disposed, having its top end resting against a supporting ring 41 attached to the base shaft 101, while the spring member 40 has its bottom side pressing on the top side of the annular coupling member 30, so that the annular coupling member 30 is pressed on the coupling gear wheel 26, which is in turn pressed on the annular frame part 203 of the bottom plate 201, which annular frame part 203 is in turn pressed on the base flange 102.

During normal operation, the noses 32 of the annular coupling member 30 engage the recessed portions 28 of the coupling gear wheel 26, so that the coupling gear wheel 26 is then fixed in a rotational sense relative to the mirror base 11. If the electromotor 20 is then excited, each second worm wheel 25 of the transmission system 21 is forced to follow an orbit around the coupling gear wheel 26 fixed relative to the mirror base 11. Because these second worm wheels 25 are bearing-mounted in the frame 12 to which the mirror housing 3 is attached as well, the mirror housing 3 is thus forced to carry out a pivotal movement relative to the support 2. If, for whatever reason, the movement of the frame 12 is arrested, the current strength through the motor 20 increases, which is detected by current-detecting means, which may be known and are therefore not further discussed here, and which are adapted to switch off the motor 20.

Although it is possible to cause the frame 12 to rotate relative to the mirror base 11 through rotation of the motor 20, the reverse is not possible on account of the self-locking characteristic of the transmission system 21. Hence, if an external force is exerted on the frame 12 (i.e.: on the mirror housing 3), then the frame 12 is fixedly held relative to the mirror base 11 by the transmission system 21. Under normal conditions, the mirror housing 3 is thus prevented from being pivoted by "normal" external forces, such as for instance driving wind.

On the other hand, in some cases it may, by contrast, be desired to pivot the mirror housing 3 manually by exerting an external force. Further, from a point of view of safety, it is generally even laid down by law that the mirror housing 3 yields upon the occurrence of forces above a particular level. Such yielding is also advantageous to the pivoting mechanism 10, because that prevents the load on the pivoting mechanism 10 from becoming thus great during the occurrence of unusually great forces, that the mechanism could break down.

Hence, an uncoupling operation should take place between the transmission system 21 and the base shaft 101. To that end, the noses 32 of the annular coupling member 30 and the matching recesses 28 of the coupling gear wheel 26 have inclined side faces, dimensioned so that upon the occurrence of a particular tangential force (moment; couple) above a predetermined level, the noses 32 of the annular coupling member 30 are urged from the matching recesses 28 of the coupling gear wheel 26, and the annular coupling member 30 is axially pressed upwards and the spring 40 is thus depressed. At that moment, the coupling between the coupling gear wheel 26 and the mirror base 11 is removed, and the mirror housing 3 with the frame 12, the motor 20, the transmission system 21 and the coupling gear wheel 26 can as a whole rotate freely relative to the mirror base 11. The annular coupling member 30 remains fixed in a rotational sense relative to the mirror base 11.

This predetermined level is chosen to be greater than the maximum couple that can be produced by the motor 20, but not thus high that, as a result, too great a load is exerted on the transmission system 21 and the motor 20 during manual pivoting.

As mentioned, the friction ring 27 is secured relative to the base shaft 101 in rotational direction, for which purpose the friction ring 27 can have radially inwardly directed projections 29 fitting in the key ways 104 of the base shaft 101. Consequently, instrument 10 offers a relatively high resistance to pivoting under the influence of an external force, because during such a pivotal movement, both the top surface of the friction ring 27 and the bottom surface of the friction ring 27 are loaded in friction relative to the coupling gear wheel 26 and the annular frame portion 203 respectively. This effect, too, contributes to the great stability, to, for instance, driving wind.

During the pivotal movement of the mirror housing 3 relative to the vehicle support 2, the bottom side of the annular frame part 203 slides across the top side of the base flange 102. In accordance with an important aspect of the present invention, the base flange 102 and the annular frame part 203 comprise means for defining the fold-out position, for limiting the fold-in movement, and for limiting the fold-over movement, as will be described hereinafter with reference to FIGS. 5A, 5B, 6B and 6C. Hence, the fold-in limiting means define an extreme fold-in position; however, it is possible that the application construction such as a wing mirror comprises additional fold-in limiting means which come into action sooner than the fold-in limiting means according to the present invention defined between the base flange 102 and the annular frame part 203, in which case those additional fold-in limiting means define the practically extreme fold-in position. A comparable observation applies with respect to the fold-over limiting means. However, it may be the case that, for lack of space, it is not desired or not even possible to provide such additional fold-in limiting means externally of the actuator 10; for such cases, the present invention offers a pivoting mechanism which intrinsically provides all the above limitations.

FIGS. 5A and 5B show that the base flange 102 has an annular top face 150, subdivided into several rings lying one within the other, in the example shown two rings, viz. an inner ring 151 and an outer ring 152. The inner ring 151 is of recessed design through a predetermined angle α for defining a first ringsegment-shaped groove 153 having slightly inclined end walls 154 and 155. Diametrically opposite the first ringsegment-shaped groove 153, the outer ring 152 is of recessed design through the same angle α for defining a second ringsegment-shaped groove 156, also having slightly inclined end walls 157 and 158. Diametrically opposite the first ringsegment-shaped groove 153, the inner ring 151 is of raised design through a predetermined angle β for defining a first axially directed nose 159 having slightly inclined side faces 160 and 161, the angular position of the center of the first nose 159 corresponding to the angular position of the center of the second ringsegment-shaped groove 156. Similarly, the outer ring 152, radially opposite the first nose 159, is of raised design through the same angle β for defining a second axially directed nose 162 having slightly inclined side faces 163 and 164, the angular position of the center of the second nose 162 corresponding to the angular position of the center of the first ringsegment-shaped groove 153.

FIGS. 6B and 6C show that the annular frame part 203 has an annular bottom face 250, which, similarly to the top face 150 of the base flange 102, is subdivided into rings lying one within the other, hence in the example shown two rings, an inner ring 251 and an outer ring 252. The inner ring 251 is of recessed design through an angle equal to the predetermined angle α for defining a third ringsegment-shaped groove 253 having slightly inclined end walls 254 and 255. Diametrically opposite the third ringsegment-shaped groove 253, the outer ring 252 is of recessed design through the same angle α for defining a fourth ringsegment-shaped groove 256, also having slightly inclined end walls 257 and 258. Diametrically opposite the third ringsegment-shaped groove 253, the inner ring 251 is of raised design through the same angle β for defining a third axially directed nose 259 having slightly inclined side faces 260 and 261, the angular position of the center of the third nose 259 corresponding to the angular position of the center of the fourth ringsegment-shaped groove 256. Similarly, the outer ring 252, radially opposite the third nose 259, is of raised design through the same angle β for defining a fourth axially directed nose 262 having slightly inclined side faces 263 and 264, the angular position of the center of the fourth nose 262 hence corresponding to the angular position of the center of the third ringsegment-shaped groove 253.

The dimensioning of these grooves and noses is such that in mounted condition of the pivoting mechanism 10, the first, second, third and fourth noses 159, 162, 259 and 262 fit in the third, fourth, first and second grooves 253, 256, 153 and 156 respectively, with the bottom face 250 of the annular frame part 203 resting on top face 150 of the base flange 102.

An important advantage of the present invention is that the pivoting mechanism 10 can be used both for a left wing mirror and for a right wing mirror, without requiring modifications. When used in a left wing mirror, the normal operational position (fold-out position) is defined by the inclined end walls 154, 157, 254, 257 of the first, second, third and fourth grooves 153, 156, 253 and 256 respectively. If the pivoting mechanism 10 is in the fold-out position, the side faces 261, 264, 161, 164 of the third, fourth, first, second noses 259, 262, 159, 162 respectively contact the inclined end walls 154, 157, 254, 257 of the first, second, third and fourth grooves 153, 156, 253 and 256 respectively. During a fold-in movement, the third, fourth, first, second noses 259, 262, 159, 162 move through the first, second, third and fourth grooves 153, 156, 253 and 256, until their other inclined side faces 260, 263, 160, 163 respectively contact the other inclined end walls 155, 158, 255, 258 of the first, second, third and fourth grooves 153, 156, 253 and 256 respectively, so that an extreme fold-in position of the left mirror is defined. As mentioned hereinabove, the mirror may be provided with external stops preventing the pivoting mechanism 10 from reaching the extreme fold-in position.

When used in a right wing mirror, the normal operational position (fold-out position) is defined by the inclined end walls 155, 158, 255, 258 of the first, second, third and fourth grooves 153, 156, 253 and 256 respectively. If the pivoting mechanism 10 is in the fold-out position, the side faces 260, 263, 160, 163 of the third, fourth, first, second noses 259, 262, 159, 162 respectively contact the inclined end walls 155, 158, 255, 258 of the first, second, third and fourth grooves 153, 156, 253 and 256 respectively. During a fold-in movement, the third, fourth, first, second noses 259, 262, 159, 162 move through the first, second, third and fourth grooves 153, 156, 253 and 256, until their other inclined side faces 261, 264, 161, 164 respectively contact the other inclined end walls 154, 157, 254, 257 of the first, second, third and fourth grooves 153, 156, 253 and 256 respectively, so that an extreme fold-in position of the right mirror is defined. As mentioned, the mirror may be provided with external stops preventing the pivoting mechanism 10 from reaching the extreme fold-in position.

Hence, both for a left mirror and for a right mirror, the maximum angular distance between the fold-out position and the fold-in position (freedom of fold-in movement) as defined by the noses and grooves, equals $\alpha-\beta$; in a preferred embodiment, this distance is about 80°.

Now follows a more detailed description of the operation of the pivoting mechanism 10 as illustrated in FIGS. 5 and 6, upon excitation of the motor 20, used in a left mirror, while it is understood that that mirror is not provided with additional stop means for defining a practically extreme fold-in position or practically extreme fold-over position. With reference to the above, it will be understood by anyone skilled in the art that for use in a right mirror, the operation is symmetrical, for which reason the operation for such a use will not be separately repeated.

In this discussion, the fold-out position is in each case started from, and, accordingly, the side faces 261, 264, 161, 164 of the third, fourth, first, second noses 259, 262, 159, 162 respectively contact the inclined end walls 154, 157, 254, 257 of the first, second, third and fourth grooves 153, 156, 253 and 256 respectively.

Electric Force

When, by operating a control button, the driver excites the motor 20 in a direction corresponding to the fold-in movement, the second worm wheel 25 of the transmission system 21 travels around the coupling gear wheel 26 anti-clockwise, with the frame 12 pivoting anti-clockwise and the third, fourth, first, second noses 259, 262, 159, 162 being displaced through the first, second, third and fourth grooves 153, 156, 253 and 256, until their other inclined side faces 260, 263, 160, 163 respectively contact the other inclined end walls 155, 158, 255, 258 of the first, second, third and fourth grooves 153, 156, 253 and 256 respectively. Consequently, an opposing force is offered to the pivotal movement, so that the current strength through the motor 20 increases whereupon, as mentioned hereinabove, the motor 20 is switched off, so that the fold-in movement ends.

When the driver desires that the mirror housing 3 be pivoted back into the fold-out position, he operates a control button to excite the motor 20 in the opposite direction. Accordingly, the above-described process repeates itself in opposite direction, until the side faces 261, 264, 161, 164 of the third, fourth, first, second noses 259, 262, 159, 162 respectively contact the inclined end walls 154, 157, 254, 257 of the first, second, third and fourth grooves 153, 156, 253 and 256 respectively, so that an opposing force is offered again to the pivotal movement, which cannot be overcome by the motor 20, so that the fold-out movement ends.

During this pivotal movement, the coupling gear wheel 26 remains stationary relative to the base shaft 101 and, accordingly, relative to the friction ring 27, so that the amount of friction to be overcome by the motor 20 is less than in the case of an external force.

External Mechanical Force

When a relatively great, rearwardly directed force is externally exerted on the mirror housing 3 in the fold-out position, the annular coupling member 30 will be pushed away axially to uncouple the coupling gear wheel 26 from the base shaft 101 in order to prevent damage to the transmission system 21 and to the motor 20, as described hereinabove. During the following fold-in movement of the mirror housing 3, the coupling gear wheel 26 remains fixed relative to the frame 12, and the annular coupling member 30 remains fixed relative to the base shaft 101. The third, fourth, first, second noses 259, 262, 159, 162 are displaced through the first, second, third and fourth grooves 153, 156, 253 and 256, maximally until their other inclined side faces 260, 263, 160, 163 respectively contact the other inclined end walls 155, 158, 255, 258 of the first, second, third and fourth grooves 153, 156, 253 and 256 respectively. When the external force is removed, the mirror housing stays in the fold-in intermediate position then reached, which is maximally the extreme fold-in position. Thus, the external force (couple) required for causing the mirror housing 3 to make the fold-in movement is mainly determined by friction forces, whereas the external force (couple) required for causing the mirror housing 3 to leave the fold-out position is equal to that friction force increased by the force required for pushing away the annular coupling member 30 axially.

From the fold-in position, or any fold-in intermediate position, the mirror housing 3 can be brought back into the fold-out position through a manual fold-out movement. The external force (couple) required therefor is again mainly determined by friction forces. During the fold-out movement of the mirror housing 3, the coupling gear wheel 26 remains fixed relatively to the frame 12, and the annular coupling member 30 remains fixed relative to the base shaft 101. The third, fourth, first, second noses 259, 262, 159, 162 are displaced through the first, second, third and fourth grooves 153, 156, 253 and 256, until in the fold-out position their side faces 261, 264, 161, 164 respectively contact the inclined end walls 154, 157, 254, 257 of the first, second, third and fourth grooves 153, 156, 253 and 256 respectively, at which moment the force required for further pivoting increases substantially, which the user perceives as a blocking. Thus, the fold-out position is defined reproducibly and positively, and the user knows with certainty that he has reached the fold-out position.

If the mirror mechanism 3 was brought from the fold-out position into this fold-in position or any fold-in intermediate position by an external force, the noses 32 of the annular coupling member 30 will, when the manual fold-out movement is carried out, be pressed into the recesses 28 of the coupling gear wheel 26 again when the fold-out position is reached, which is accompanied by a click that is perceptible (audible and sensible) by the user.

From any, manually reached fold-in intermediate position, the mirror housing 3 can also be brought back into the fold-out position through excitation of the motor 20. To that end, the motor 20 is excited in a direction opposite to the direction required for folding in. As a result, the coupling gear wheel 26 will be rotated first, until the recesses 28 of the coupling gear wheel 26 are aligned with the noses 32 of the annular coupling member 30, at which moment the noses 32 of the annular coupling member 30 are pressed again into the recesses 28 of the coupling gear wheel 26. From that moment onwards, the coupling gear wheel 26 is coupled to the base shaft 101 again, and the rotation of the motor 20 results in the folding out of the mirror housing 3, as described hereinabove.

If, when the mirror housing 3 is in any, manually reached fold-in intermediate position, the motor 20 were excited in a direction equal to the direction required for folding in, this cannot do any harm: the mirror housing 3 then simply reaches the fold-in position, and can from there be brought back into the fold-out position in the usual manner.

As described hereinabove, when a relatively great, forwardly directed force is externally exerted on the mirror housing 3, the annular coupling member 30 will be pushed away axially to uncouple the coupling gear wheel 26 from the base shaft 101. Furthermore, on account of the inclined position of the side faces 261, 264, 161, 164 of the third, fourth, first, second noses 259, 262, 159, 162 and the inclined position of the end walls 154, 157, 254, 257 of the first, second, third and fourth grooves 153, 156, 253 and 256, the third, fourth, first, second noses 259, 262, 159, 162 will be pressed from the first, second, third and fourth grooves 153, 156, 253 and 256, thus involving axial displacement of the entire frame 12 with the mirror housing 3 attached thereto through a distance equal to the axial dimension (height) of the third, fourth, first, second noses 259, 262, 159, 162. During the next fold-over movement, which now requires relatively little force, the coupling gear wheel 26 remains fixed relative to the frame 12, and the annular coupling member 30 remains fixed relative to the base shaft 101. The first and second noses 159, 162 slide across the inner ring 251 and the outer ring 252 respectively of the bottom face 250 of the annular frame part 203, while the third and fourth noses 259, 262 slide across the inner ring 151 and the outer ring 152 respectively of the top face 150 of the base flange 102. When the external force is removed, the mirror housing stays in the fold-over intermediate position then reached, which, outwardly, is the extreme fold-over position, and which is reached when the inclined side faces 261, 264 of the third and fourth noses 259, 262 meet the inclined side faces 161, 164 of the first and second noses 159, 162 respectively.

The maximum angular distance between the fold-out position and the extreme fold-over position (freedom of fold-over movement) as defined by these noses and grooves, is equal to ½(360°−α−β) and in a preferred embodiment is more than 100°. In a preferred embodiment α is about 115° and β is about 35°.

In each fold-over intermediate position (and in the extreme fold-over position), the noses 159, 162, 259, 262 form four supporting points, not in alignment, for the frame 12 relative to the base 11, so that a stable situation is ensured. If so desired, the number of rings laying one within the other, with grooves and noses formed therein, can be increased to increase the number of the supporting points. FIGS. 7A–D illustrate a variant of the above-discussed pivoting mechanism wherein the number of rings equals three. In FIGS. 7A–D identical reference numerals designate identical or comparable components, and it is understood that, compared with the embodiment illustrated in FIGS. 5 and 6, a third ring is added outside the two rings mentioned before. However, it will be clear that the third ring can also be arranged inside the two rings mentioned before, or between them. The third ring of the annular top face 150 of the base flange 102 is designated by the reference numeral 170, and has a fifth ringsegment-shaped groove 171 having an angular dimension α and, diametrically opposite thereto, a fifth axially directed nose 172 having an angular dimension β. The fifth ringsegment-shaped groove 171 has slightly inclined end walls 173 and 174; the fifth axially directed nose 172 has slightly inclined side faces 175 and 176. The angular position of the center of the fifth nose 172 is shifted approximately 90° relative to the angular position of the center of the first nose 159. Similarly, the annular bottom face 250 of the annular frame part 203 has a third ring 270, having formed therein a sixth ringsegment-shaped groove 271 having an angular dimension α and, formed diametrically opposite thereto, a sixth axially directed nose 272 having an angular dimension β. The sixth ringsegment-shaped groove 271 has slightly inclined end. walls 273 and 274; the sixth axially directed nose 272 has slightly inclined side faces 275 and 276; the angular position of the center of the sixth nose 272 is shifted 90° relative to the angular position of the center of the third nose 259.

The force (couple) required for causing the mirror housing 3 to leave the fold-out position in forward direction is greater than the force (couple) required for causing the mirror housing 3 to leave the fold-out position in rearward direction. After all, in both cases the coupling gear wheel 26 should be uncoupled from the base shaft 101, for which purpose the spring member 40 is depressed through a distance equal to axial dimension (height) of the noses 32 of the annular coupling member 30, whereas during a forward pivoting direction, moreover, the entire frame 12 should be axially displaced relative to the base shaft 101 through a distance equal to the axial dimension (height) of third, fourth, first, second noses 259, 262, 159, 162, so that the spring member 40 should in that case be depressed further.

As mentioned, the extreme fold-over position is reached when the inclined side faces 261, 264 of the third and fourth noses 259, 262 meet the inclined side faces 161, 164 of the first and second noses 159, 162 respectively. Because of their design, as illustrated in FIGS. 5 and 6, those noses in principle allow a further pivotal movement. This would involve the entire frame 12 being lifted still further relative to the base shaft 101 through a distance equal to the height of these noses 159, 162, 259, 262, and the spring 40 being depressed still further, which requires still more force. The pivoting mechanism 10 can be provided with stop means which prevent such a further axial displacement of the frame 12. In a possible embodiment, it is the spring 40 itself which acts as intrinsic stop member, in that its windings contact each other, but this is not generally desired. In another possible embodiment, the axial dimension of the annular coupling member 30 is chosen so that a further axial displacement thereof is arrested by the supporting ring 41.

However, it is also possible to shape the noses 159, 162, 259, 262 so that further rotation is directly opposed. An example of such an embodiment is illustrated in FIGS. 8A–D, wherein identical reference numerals designate identical or comparable components as in FIGS. 5 and 6. Next to the first nose 159, a first stop cam 181 is positioned, having substantially straight end faces 182 and 183. The tangential dimension of the first stop cam 181 is substantially equal to the tangential dimension of the first nose 159, or is slightly larger than the tangential dimension of the first nose 159, the tangential dimension of each nose being defined as the tangential dimension at half the height of that nose. Similarly, the tangential dimension of each groove is defined as the tangential dimension at half the depth of that groove. The third groove 253 has a radial dimension (width) sufficient to receive the combination of the first nose 159 and the first stop cam 181. In radial direction (width direction), the third groove 253 is divided into two portions: an inner groove portion 253' wherein the nose 159 is located, and an outer groove portion 253", wherein the stop cam 181 is located. The outer groove portion 253" has a greater tangential dimension than the inner groove portion 253', and comprises substantially axially directed end faces. Mutatis mutandis, comparable adaptations are made to the second, third and fourth noses and to the first, second and fourth grooves.

In the extreme fold-in position and in the fold-out position, each stop cam reaches into the extended portion of the groove portion associated therewith without contacting the end thereof. The operation of the mechanism is then as described hereinabove. More particularly, during the exertion of a forwardly directed force in the fold-out position, the fold-over movement will be carried out unchanged on account of the cooperation between the inclined side faces of the noses with the inclined end faces of the grooves associated therewith. When the extreme fold-over position is reached, the axially directed side faces of the stop cams bump against each other, so that further pivoting is not possible.

From any fold-over intermediate position, the mirror housing 3 can be brought back into the fold-out position through a manual fold-back movement. The external force (couple) required therefore is again mainly determined by friction forces. During the fold-back movement of the mirror housing 3, the coupling gear wheel 26 remains fixed relative to the frame 12, and the annular coupling member 30 remains fixed relative to the base shaft 101. The third, fourth, first, second noses 259, 262, 159, 162 are displaced over the rings 151, 152, 251, 252 respectively, until they are pressed into the first, second, third and fourth grooves 153, 156, 253 and 256 in the fold-out position, at which moment the noses 32 of the annular coupling member 30 are pressed again into the recesses 28 of the coupling gear wheel 26, which is accompanied by a click perceptible (audible and sensible) by the user, while at that moment the force required for further pivoting increases substantially, which the user perceives as a blocking. Because of all this, the user knows that he has reached the fold-out position.

From any fold-over intermediate position, the mirror housing 3 can also be brought back again into the fold-out position through operation of the motor 20. To that end, the motor 20 is excited in the same direction as for the fold-in movement. Initially, the coupling gear wheel 26 will be rotated relative to the mirror housing 3 and relative to the mirror base 11, until the recesses 23 of the coupling gear wheel 26 become aligned with the noses 32 of the annular coupling member 30: these noses 32 then engage the recesses 23 of the coupling gear wheel 26 to couple the coupling gear wheel 26 to the base tube 101. From that moment onwards, the coupling gear wheel 26 remains secured in a rotational sense relative to the base shaft 101 and the frame 12 with the mirror housing 3 pivots into the fold-out position (fold-back movement). When the noses 159, 162, 259, 262 reach the grooves 253, 256, 153, 156, the frame 12 with the mirror housing 3 will be axially pressed downwards again, but the motor 20 does not experience a greater opposing force and the pivotal movement continues (fold-in movement) until the extreme fold-in position is reached. After that, the direction of rotation of the motor 20 is reversed (fold-out movement). When the fold-out position is reached, the motor 20 is switched off, as described hereinabove.

If, when the mirror housing 3 is in any, manually reached fold-over intermediate position, the motor 20 were excited in a direction equal to the direction required for folding out, this can do no harm: the mirror housing 3 then simply reaches the fold-over position, and can from there be brought back into the fold-in position in the usual manner.

Under normal conditions, the pivoting mechanism will only be operated electrically, and will hence only be able to assume the fold-out position or the extreme fold-in position. If the mechanism is brought into a particular position manually, that position can be a fold-over position or a fold-in position. Therefore, a control system for the pivoting mechanism is adapted to bring, if it is desired to bring the pivoting mechanism from any intermediate position into the fold-out position, the mechanism first into the fold-in position, by way of reference, and from there into the fold-out position. However, such a reference procedure is only necessary if the mechanism is in a position that is reached through the action of an external force. Hence, there is a need for detection means adapted to detect whether the pivoting mechanism is in a position reached through the action of an external force, and which provide a signal which can be used by a control device for the motor for optionally carrying out this reference procedure on the basis thereof.

Figure 9A:
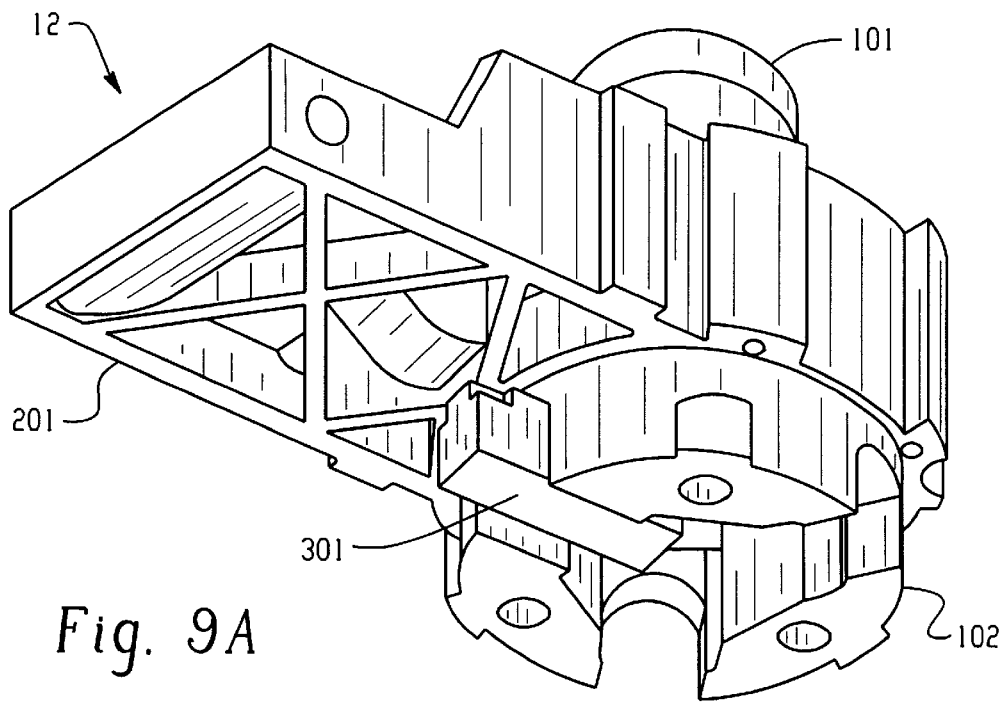
FIGS. 9A–9B illustrate the position of detection means.
Figure 9B:
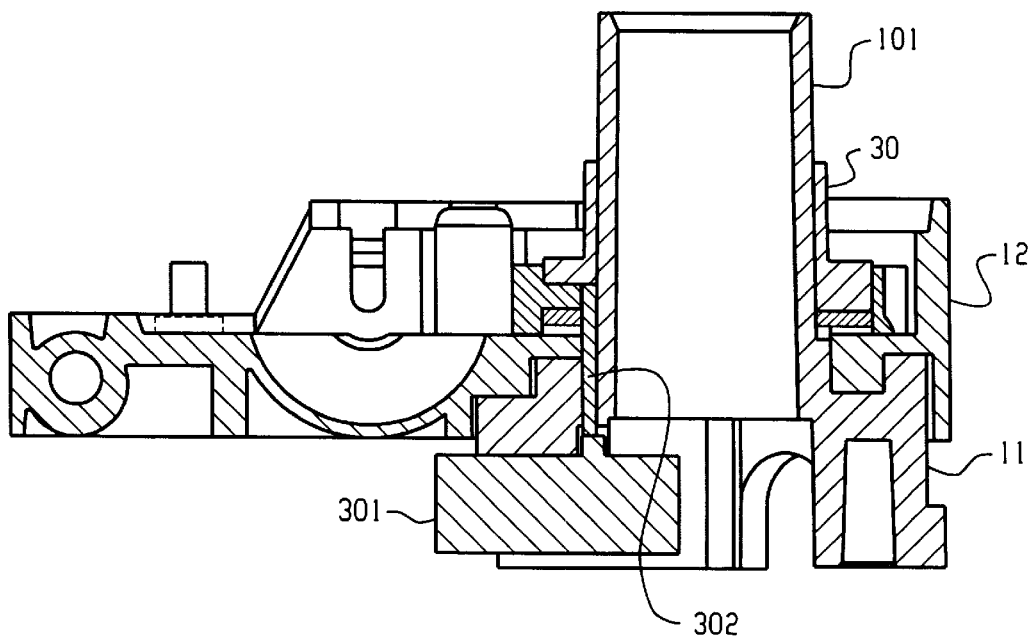

The invention provides the presence of such detection means, which according to the invention advantageously have a simple and direct structure and are properly guarded against the action of any dust and dirt. An embodiment of those detection means 300 comprises a microswitch 301 having an operating rod 302. The microswitch 301 is disposed in the base flange 102, as is shown in the bottom view of FIG. 9A. In the base flange 102, an axially directed passage is provided in line with one of the key ways 104. The operating rod 302 extends through this opening, as is shown in the section of FIG. 9B, and extends over some distance into this key way 104, beyond the friction ring 27 and the coupling gear wheel 26, for which purpose the friction ring 27 has fewer projections 29 than the number of key ways 104, as is clearly shown in FIG. 3. The top end of the operating rod 302 abuts against the bottom side of a projection 31 of the annular coupling member 30.

Under normal operating conditions, the noses 32 on the bottom side of the annular coupling member 30 are lowered into the recesses 28 of the coupling gear wheel 26. In that condition, the annular coupling member 30 presses on the operating rod 302, the microswitch 301 being in a first switch condition (open or closed). As described, during pivoting under the influence of an external force, the annular coupling member 30 is lifted, as a result of which the microswitch 301 is brought into a second switch condition (closed or open) via the operating rod 302. Via lines not shown, the contacts of the microswitch 301 are connected to a control member for the motor 20, as will be understood by anyone skilled in the art.

Although the transmission system 21 according to the present invention may have a construction other than the embodiment discussed and illustrated, the embodiment illustrated is preferred for reasons of strength, while the use of two worm wheels 25, both engaging the coupling gear wheel 26 and both driven by a worm 24 coaxially formed on the first worm wheel 23, is particularly preferred. In this connection, it is advantageous if the coupling gear wheel 26 has inclined teeth, corresponding to inclined teeth of the second worm wheel 25.

By positioning the coupling gear wheel 26 on top of the annular frame part 203 of the frame 12, directly or, optionally, with the interposition of the friction ring 27, with the second worm wheel 25 of the transmission system 21 and the second worm 24 driving this worm wheel 25 being located in the plane of that coupling gear wheel 26, the pivoting mechanism 10 can be formed with a slight end-to-end dimension.

The pivoting mechanism 10 according to the present invention provides the functions described with a minimum of components. Those components can be manufactured in one piece, for instance from plastic, with noses and/or recesses or grooves formed thereon, so that a saving is made on the manufacturing costs. A saving on assembling costs can be achieved by making the coupling gear wheel 26 symmetrical, viz. with recesses 23 in its top face as well as in its bottom face.

Since the noses and grooves which define the extreme fold-in position and the fold-out position operate in one direction only, it is provided that during an electric pivoting operation, there is never a position-determining opposing force to be overcome, so that the motor 20 and the transmission system 21 need not be particularly strong and can therefore be relatively cheap.

It will be understood by a skilled person that it is possible to change or modify the embodiment shown of the apparatus according to the invention without departing from the inventive concept or the protective scope as defined in the claims. For instance, it is possible that the coupling gear wheel comprises noses while the annular coupling member comprises recessed portions corresponding thereto. The rotational securing of the annular coupling member relative to the base shaft can be realized by other means, for instance by selecting a profile other than a key way-profile.

Further, it is not strictly necessary that the grooves and noses of the base flange 102 and the frame 12 be diametrically opposite each other, although this is preferred for reasons of symmetry. It will be understood by anyone skilled in the art that a relative displacement of a groove requires a corresponding relative displacement of the nose fitting in that groove.

Further, it will be understood that a reverse assembly is also possible, with the mirror base with the base shaft then being attached to the mirror housing, while the frame is attached to the support mounted on the vehicle.

In the embodiment described, with each ring one nose and one groove are associated. However, it is also possible that with each ring two noses and two grooves are associated, the order for each ring being: nose-groove-nose-groove, with steps of 90°.

What is claimed is:

1. An electrically operable pivoting actuator (10) comprising:

a mirror base (11) having a base shaft (101) and a base flange (102) with a substantially annular top face (150);

a frame (12), of which an annular frame part (203) having a substantially annular bottom face (250) extends around the base shaft (101) and rests on the base flange (102);

a substantially annular coupling gear wheel (26) disposed around the base shaft (101) on said annular frame part (203) of the frame (12), optionally with the interposition of a friction ring (27);

a substantially annular coupling member (30) arranged on the top face of the coupling gear wheel (26);

means (28, 32) for providing a couple-limited claw coupling between the bottom face of the annular coupling member (30) and the top face of the coupling gear wheel (26);

means (31, 103, 104) for providing a rotational securing and axial freedom of the annular coupling member (30) relative to the base shaft (101);

means (40) for exerting an axially downwardly directed pressure force on the top face of the annular coupling member (30);

an electromotor (20);

a transmission sytem (21) coupled between the driven shaft (20') of the electromotor (20) and the coupling gear wheel (26);

unidirectionally operating, couple-limited stop means (150–164, 250–264) defined between the mirror base (11) and the housing frame (12), for defining the fold-out position, an extreme fold-in position and an extreme fold-over position of the pivoting actuator (10), said stop means comprising:

a first ringsegment-shaped groove (153) formed in an inner ring (151) of the annular top face (150) of the mirror base (11) and having inclined end faces (154, 155), a second ringsegment-shaped groove (156) formed in an outer ring (152) of said top face (150) and having inclined end faces (157, 158), a third ringsegment-shaped groove (253) formed in an inner ring (251) of the annular bottom face (250) of the annular frame part (203) and having inclined end faces (254, 255), a fourth ringsegment-shaped groove (256) formed in an outer ring (252) of said bottom face (250) and having inclined end faces (257, 258), said grooves having mutually equal angular dimensions ($\alpha$);

a first nose (159) formed on the inner ring (151) of said top face (150) and having inclined side faces (160, 161), a second nose (162) formed on the outer ring (152) of said top face (150) and having inclined side faces (163, 164), a third nose (259) formed on the inner ring (251) of said bottom face (250) and having inclined side faces (260, 261), a fourth nose (262) formed on the outer ring (252) of said bottom face (250) and having inclined side faces (263, 264), said first nose (159) extending into said third groove (253), said second nose (162) extending into said fourth groove (256), said third nose (259) extending into said first groove (153), and said fourth nose (262) extending into said second groove (156);

said noses having mutually equal angular dimensions (β).

2. A mechanism according to claim 1, wherein the base flange (102) and the base shaft (101) are formed as one whole.

3. A mechanism according to claim 1 or 2, wherein the transmission system (21) comprises at least one worm wheel (25) driven by a worm (24), said worm wheel (25) being bearing-mounted on the frame (12) and engaging said coupling gear wheel (26), said worm wheel (25) having inclined teeth corresponding to the pitch of the worm (24), and the coupling gear wheel (26) having inclined teeth corresponding to the inclined teeth of said worm wheel (25).

4. A mechanism according to claim 3, wherein the transmission system (21) comprises two of such worm wheels (25), coupled in parallel to the coupling gear wheel (26), said two worm wheels (225) being driven by two worms (24) that are positioned in line and preferably form one whole.

5. A mechanism according to any one of the preceding claim 1, wherein the base flange (102) comprises radial projections (110), preferably three, adapted to form a bayonet fit in corresponding recesses in a support (2) fixedly mounted on a vehicle (1).

6. A mechanism according to any one of the preceding claim 1, wherein α is about 115° and β is about 35°.

7. A mechanism according to anyone of the preceding claim 1, wherein a friction ring (27) is disposed between the coupling gear wheel (26) and the annular frame part (203), said friction ring (27) being secured in rotational direction relative to the base shaft (101).

8. A mechanism according to any one of the preceding claim 1, wherein a stop cam (181) having substantially axially directed side faces (182, 183) is provided next to a nose (159), and wherein the groove (253) associated with said nose (159) is subdivided into an inner portion (253') having inclined end faces (254, 255) and an outer portion (253") having axially directed end faces, the tangential dimension of the outer portion (253") being greater than the tangential dimension of the inner portion (253').

9. A mechanism according to any one of the preceding claim 1, wherein detection means (300) are provided which are adapted to detect whether the mechanism is in a position reached by an external force action.

10. A mechanism according to claim 9, wherein said detection means (300) comprise a microswitch (301) operated by an operating rod (302) extending through an opening in the base flange (102) and whose end cooperates with the annular coupling member (30).

\* \* \* \* \*